(12) United States Patent
Inglis et al.

(10) Patent No.: US 6,690,449 B1
(45) Date of Patent: Feb. 10, 2004

(54) LCD POWER LOSS INDICATION

(75) Inventors: Edward Inglis, Fleet (GB); Andrew Cawte, High Wycombe (GB)

(73) Assignee: Cisco Technology, Inc., San Jose, CA (US)

( * ) Notice: Subject to any disclaimer, the term of this patent is extended or adjusted under 35 U.S.C. 154(b) by 10 days.

(21) Appl. No.: 10/171,189

(22) Filed: Jun. 11, 2002

(51) Int. Cl.[7] .................. G02F 1/13; G02F 1/1335; G09F 13/12
(52) U.S. Cl. .................. 349/199; 349/96; 349/200; 349/201; 349/199; 340/815.57
(58) Field of Search .................. 349/96, 200, 201, 349/199; 340/815.5, 815.57

(56) References Cited

U.S. PATENT DOCUMENTS 5,673,028 A * 9/1997 Levy .................. 340/635

* cited by examiner

Primary Examiner—Robert H. Kim
Assistant Examiner—Jeanne A. Di Grazio

(57) ABSTRACT

A device that provides a display indicating an absence of power to an LCD is disclosed. The device includes a continuous polarizing filter layer disposed within a display area that makes up a portion of the total display area of the LCD. A layer of liquid crystals is disposed between alignment gratings and optically coupled to the continuous polarizing filter layer. A discontinuous polarizing filter layer is optically coupled to the layer of liquid crystals. The discontinuous polarizing filter layer has a plane of polarization aligned with the plane of polarization of the continuous polarizing filter, and the discontinuous polarizing filter layer comprises a contour within the display area conforming to an image, so that the image is displayed in the absence of an electric field and indicates an absence of power.

18 Claims, 5 Drawing Sheets

LCD POWER LOSS INDICATION

FIELD OF THE INVENTION

The present invention relates to the field of liquid crystal displays (LCD's). Specifically, embodiments of the present invention relate to an LCD power loss indication.

BACKGROUND OF THE INVENTION

Portable electronic devices, such as telephones, calculators, personal digital assistants, handheld computer systems or two-way radios are frequently equipped with LCD display screens. These devices are generally powered using either rechargeable or disposable batteries. There are many other similar types of electronic devices that have a battery and an LCD screen. Video game systems, pagers, GPS's, watches, clocks, and other such devices are examples of other types of electronic devices in common use that may contain a battery and an LCD display screen.

Many of these devices have displays and/or alarms to apprise a user when the battery power is low. One conventional approach to apprising a user of low battery power is by use of a display that is illustrated in FIGS. 1A–1D. FIG. 1A illustrates an LCD display screen 100a showing a fully charged battery as exemplified by the image of a battery having three areas indicated to represent full power. FIG. 1B illustrates an LCD display screen 100b showing a partially charged battery as exemplified by the battery image having two areas indicated and one area appearing blank, signifying a lack of charge. Likewise, FIG. 1C illustrates an LCD screen 100c showing a low battery charge as exemplified by only one area indicated and the remaining area blank. FIG. 1D is an illustration of an LCD screen 100d that is inoperable, according to the prior art. The inoperability may be the result of a dead or missing battery, or it may be the result of a faulty device. If there is a dead battery or one that is not present, there is no electricity to light the indicator on the display or to sound an alarm. Thus, there is no apparent way to determine whether the screen is not showing a display because of a lack of power or because either the screen or the device containing the screen is broken.

FIG. 2A is an exploded diagram of a non-energized LCD display in accordance with prior art. The LCD is composed of a series of layers, beginning with a mirrored substrate 201 upon which is layered a continuous polarizing filter 202 with a specific orientation. Upon the polarizing filter is a semi-continuous electrode layer 203 that has spaces corresponding to the locations of connectors on electrode layer 207. Liquid crystal layer 205 is layered between alignment gratings 204 and 206, together with which, in a nonenergized state, it rotates the plane of polarization of light through a ninety degree angle as represented by arrow 210.

Referring still to FIG. 2A, discontinuous electrode layer 207 has electrodes in the contour of an image, such as shown in FIGS. 1A–1C, to be displayed when the LCD is energized. There are connectors running from the image to the edge of electrode layer 207 that are mimicked by the spaces in electrode layer 203 below so that they will not be displayed in an energized state. Above discontinuous electrode layer 207 is another continuous polarizing filter layer 208 that has a plane of polarization oriented at 90 degrees from that of continuous polarizing filter layer 202. Next is a layer of glass 209 at the top surface of the LCD display.

Light passing into the LCD display of FIG. 2A strikes the first polarizing filter 208 and is polarized. The polarized light then passes through the liquid crystal and alignment grating layers, where the molecules in the layers change the light's plane of vibration to match their own angle. When the light reaches the far side of these layers, it has been rotated ninety degrees and is matched up with the continuous polarizing filter layer 202, so it will pass through and reflect off the mirrored surface of the substrate. The reflected light passes back up through the layer stack, is again rotated by the liquid crystal layer, and is able to pass through both polarizing layers, out of the display and into the eye of an observer, thus appearing transparent on the display.

FIG. 2B is an exploded diagram of an energized LCD display in accordance with prior art. In this case electrode layers 207 and 203 are energized and have common-plane energized electrodes in the contour of the image 212. The liquid crystal molecules untwist, as indicated by arrow 211, between the common plane of energized electrodes and the polarized light in that region is blocked by polarizing filter 202. This causes the LCD to display the image as a dark area on a bright background.

While the prior art displays a depletion of the battery charge and an approaching loss of power, when the power is completely depleted or missing, it shows no indication at all. Thus, a user does not know whether the battery is dead or missing, or whether the device is in some way defective.

SUMMARY OF THE INVENTION

A device and method for indicating a power loss in an LCD is disclosed. In one embodiment, the device provides a display that indicates an absence of power to the LCD. The device includes a continuous polarizing filter layer disposed within a display area that makes up a portion of the total display area of the LCD. A layer of liquid crystals is disposed between alignment gratings and coupled to the continuous polarizing filter layer. In one embodiment a discontinuous polarizing filter layer is optically coupled to the layer of liquid crystals. The discontinuous polarizing filter layer has a plane of polarization aligned with the plane of polarization of the continuous polarizing filter, and the discontinuous polarizing filter layer comprises a contour within the display area conforming to an image, wherein the image is displayed in the absence of an electric field.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

Prior Art

Prior Art

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

A device is disclosed that provides a display indicating an absence of power to an LCD. The device includes a continuous polarizing filter layer contained within a display area that makes up a portion of the total display area of the LCD. A layer of liquid crystals is disposed between alignment gratings and coupled to the continuous polarizing filter layer. In one embodiment a discontinuous polarizing filter layer is optically coupled to the layer of liquid crystals and has a plane of polarization aligned with the plane of polarization of the continuous polarizing filter. The discontinuous polarizing filter layer has a contour within the display area that conforms to an image that is displayed in the absence of an electric field.

Figure 3:
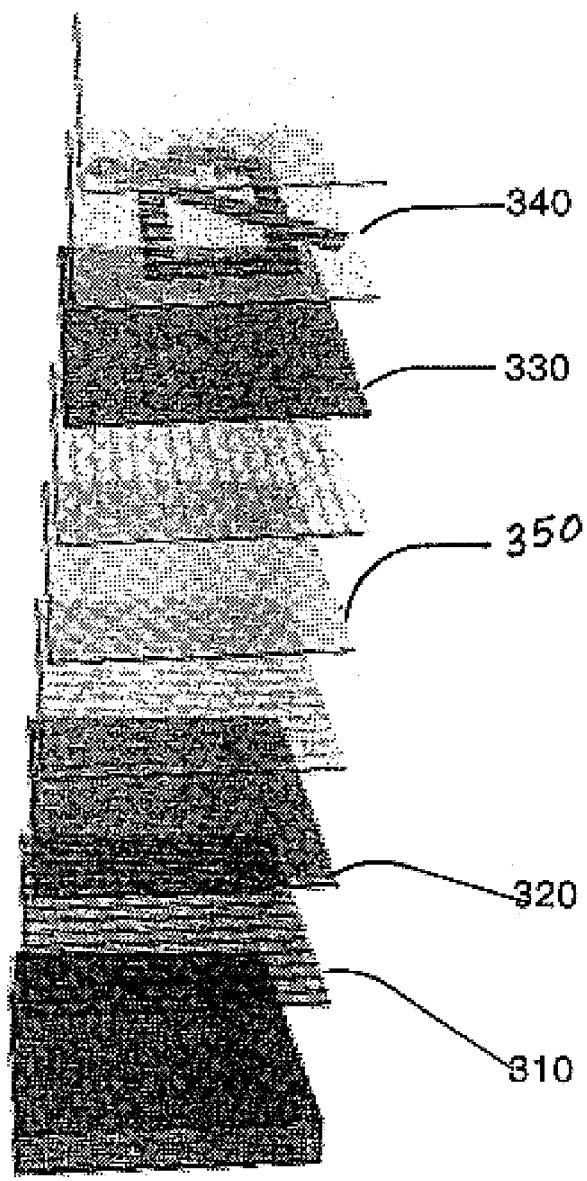
FIG. 3 is an exploded diagram of a non-energized LCD display area, in accordance with one embodiment of the present invention.

FIG. 3 is an exploded diagram of a non-energized LCD display area in accordance with one embodiment of the present invention. In the present embodiment, a display area for displaying a loss-of-power indicator is defined as being a portion of the total display area of the LCD. Within the display area, the LCD layers conform to the conventional LCD layers with the following exceptions. The upper polarization filter layer 340 may be in the contour of an image to be displayed signifying a lack of power. The lower polarization filter layer 310 may have its plane of polarization oriented the same as that of upper polarization filter layer 340. Both the lower electrode layer 320 and the upper electrode layer 330 may be continuous so that, when powered, the molecules throughout the liquid crystal layer 350 within the display area may be "untwisted" to allow light to pass through LCD layer 350 at its angle of incidence.

Figure 4A:
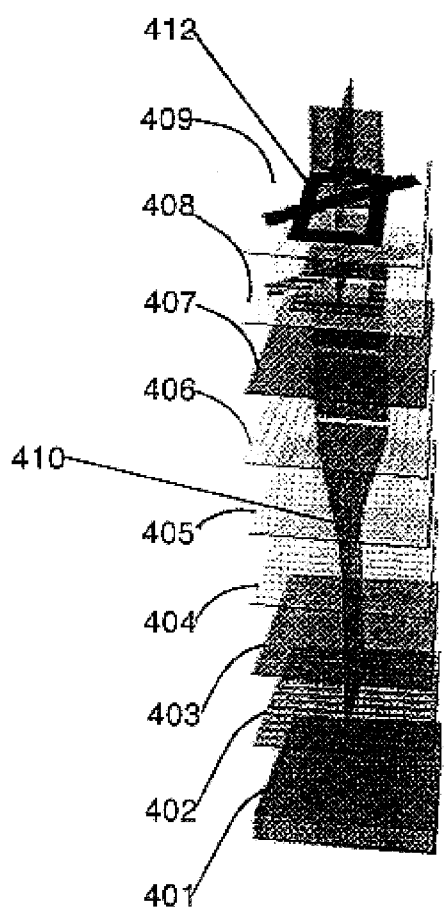
FIG. 4A is an exploded diagram of a non-energized LCD display area illustrating the light path, in accordance with one embodiment of the present invention.

FIG. 4A is an exploded diagram of a non-energized LCD display area illustrating the light path in accordance with one embodiment of the present invention. In the present embodiment, a display area for displaying a loss-of-power indicator is defined as being a portion of the total display area of the LCD. The LCD display area is composed of a series of layers, beginning with a mirrored substrate 401 upon which is layered a continuous polarizing filter 402 with a specific orientation. Upon the polarizing filter is a continuous electrode layer 403. A liquid crystal layer 405 is layered between alignment gratings 404 and 406, together with which, in a non-energized state, it rotates the plane of polarization of light through a ninety degree angle as represented by arrow 410.

Referring still to FIG. 4A, a continuous electrode layer 407 is above the alignment grating 406. It should be appreciated that electrode layers 407 and 403 do not have to be continuous provided they overlap in the region of symbol (e.g., image 412) to be displayed. Electrode layers 403 and 407 may be connected, either directly to a battery powering the device that houses the LCD display, or by means of circuitry that detects when the battery is too low to run the device. In the latter case, the circuitry then would, when detecting insufficient power, actively remove power from the display. Above electrode layer 407 is discontinuous polarizing filter layer 408 that has a plane of polarization oriented the same as that of continuous polarizing filter layer 402. Discontinuous polarizing filter layer 408 has a contour in the form of an image 412 to be displayed, signifying an absence of power. A layer of glass 409 covers the top of the LCD display where image 412 appears when electrodes 407 and 403 are not energized.

Light passing into the LCD display of FIG. 4A strikes the image in the discontinuous polarizing filter 408 with the effect that a mixture of polarized light and unpolarized light passes through each layer. As the light mixture passes through the liquid crystal and alignment grating layers, the molecules in the layers change the light's plane of vibration to match their own angle. When the light reaches the continuous polarizing layer 402, all the light that was previously polarized is now blocked (conforming to the shape of image 412). The unpolarized light passes through the layers to mirrored substrate 401 where it is reflected and exits the display, thus causing image 412 to appear dark on a bright background. In this manner a loss of power indication appears at glass layer 409.

It should be appreciated that image 412 may be one of many forms signifying power or an absence of power. In one embodiment, for example, image 412 may be in the form of a battery or in another embodiment, it may be in the form of a battery with line or a diagonal line through it, as shown in FIG. 4A. In one embodiment, image 412 may be in the form of a lightning bolt or a lightning bolt with a line or diagonal line through it. In another embodiment image 412 may be the letter "P" or the letter "P" with a line or diagonal line. In yet another embodiment, image 412 may have the form of the letter "B" or the letter "B" with a line or diagonal line through it. It should be appreciated that any form denoting power or the absence of power might be appropriate.

Figure 4B:
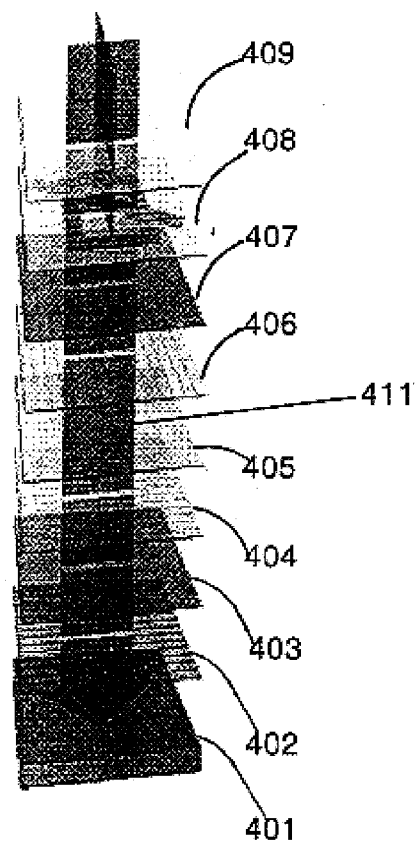
FIG. 4B is an exploded diagram of an energized LCD display area illustrating the light path, in accordance with one embodiment of the present invention.

FIG. 4B is an exploded diagram of an energized LCD display in accordance with one embodiment of the present invention. In this embodiment, the electrode layers 407 and 403 are energized. The liquid crystal molecules untwist, as indicated by arrow 211, between the common plane of energized electrodes and the light passes straight through polarizing filter 402 and is reflected by the mirrored surface of substrate 401. On the display screen the image appears as a bright area on a bright background, causing it to be transparent. Therefore, with an electric field present, image 408 may not be seen on the display screen 409 in accordance with one embodiment of the present invention.

Figure 1A:
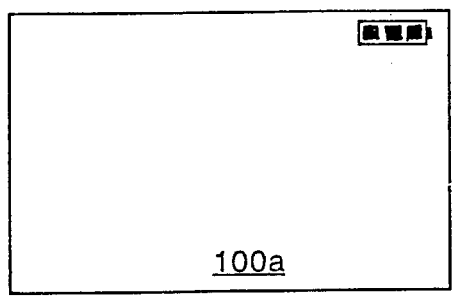
FIG. 1A illustrates an LCD display screen showing a fully charged battery.
Figure 1B:
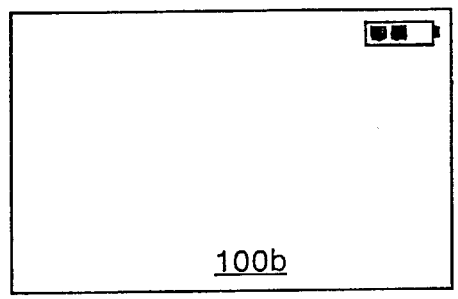
FIG. 1B illustrates an LCD display screen showing a partially charged battery Prior Art
Figure 1C:
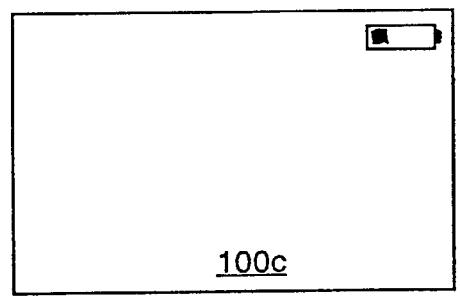
FIG. 1C illustrates an LCD screen showing a low battery charge.
Figure 1D:
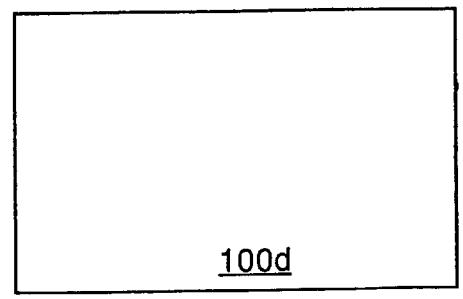
FIG. 1D is an illustration of an LCD screen that is inoperable.
Figures 2A, 2B:
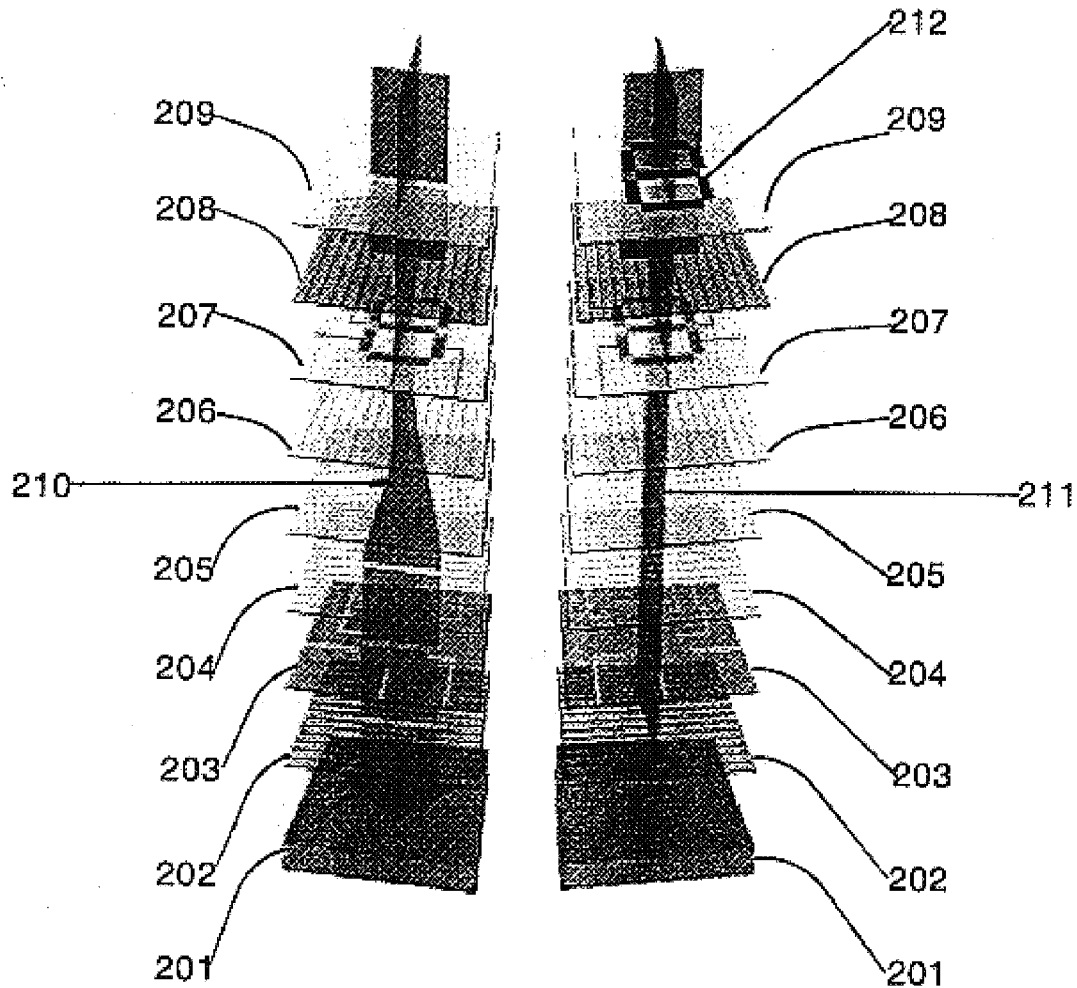
FIG. 2A is an exploded diagram of a conventional nonenergized LCD display.
FIG. 2B is an exploded diagram of a conventional energized LCD display.
Figure 5A:
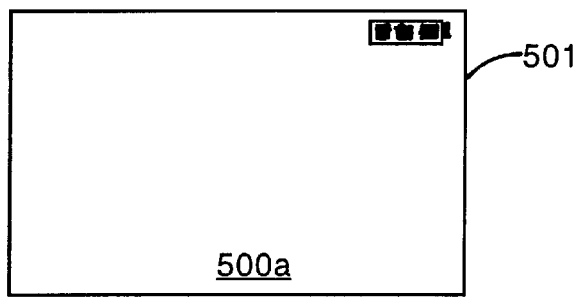
FIG. 5A illustrates an LCD display screen showing a fully charged battery, in accordance with one embodiment of the present invention.
Figure 5B:
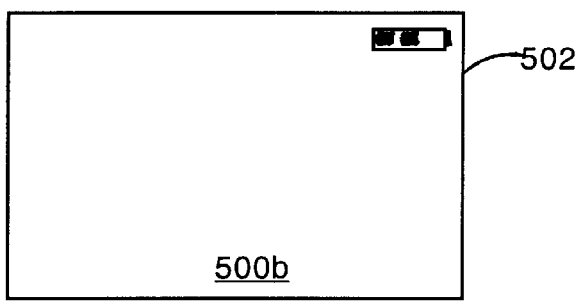
FIG. 5B illustrates an LCD display screen showing a partially charged battery, in accordance with one embodiment of the present invention.
Figure 5C:
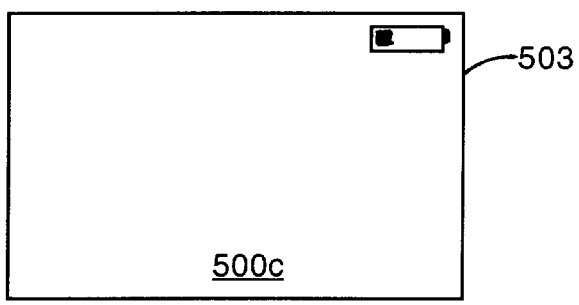
FIG. 5C illustrates an LCD display screen showing a low battery charge, in accordance with one embodiment of the present invention.

FIGS. 5A through 5D illustrate one embodiment of the present invention that may work in concert with the conventional art. FIG. 5A illustrates an LCD display screen showing a fully charged battery in accordance with one embodiment of the present invention. FIG. 5B illustrates an LCD display screen showing a partially charged battery in accordance with one embodiment of the present invention. FIG. 5C illustrates an LCD display screen showing a low battery charge in accordance with one embodiment of the present invention. In these embodiments, as in the conventional art, the portion of the display screen that indicates a charged or partially charged battery conforms to the conventional art device as described in FIG. 2B. FIGS. 5A–5C are included here as an example of the sequence of displays that may exist prior to the display of FIG. 5D, according to one embodiment. It should be appreciated that there are a wide variety of ways that are suitable for indicating a partial loss of battery charge. For example, an alarm may be sounded instead of a display, or in addition to a display or the display might be in the form of a diminishing lightning bolt, or multiple letter "B's".

Figure 5D:
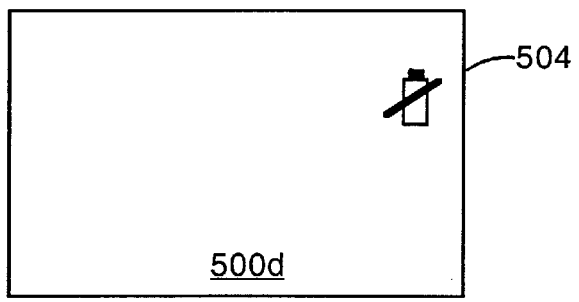
FIG. 5D illustrates an LCD display screen showing a dead or missing battery, in accordance with one embodiment of the present invention.

FIG. 5D illustrates an LCD display screen showing a discharged or missing battery in accordance with one embodiment of the present invention. It should be appreciated that the image displayed may be in the form of a battery with a line or diagonal line through it as illustrated in the present embodiment, or it may be in the form of a battery outline with no line or diagonal line. The image may be in any plausible form that might signify power or a lack of power, e.g., a lightning bolt, a letter "P", a letter "B" or any of the aforementioned with a line or diagonal line through it.

The preferred embodiment of the present invention, LCD Power Loss Indication, is thus described. While the present invention has been described in particular embodiments, it should be appreciated that the present invention should not be construed as limited by such embodiments, but rather construed according to the below claims.

What is claimed is:

1. In an LCD, a device for indicating an absence of power to said LCD comprising:
   a continuous polarizing filter layer disposed within a display area that comprises a portion of the total display area of said LCD;
   a layer of liquid crystals disposed between alignment gratings and optically coupled to said continuous polarizing filter layer; and
   a discontinuous polarizing filter layer optically coupled to said layer of liquid crystals, said discontinuous polarizing filter layer having a plane of polarization aligned with the plane of polarization of said continuous polarizing filter, and wherein said discontinuous polarizing filter layer comprises a contour within said display area conforming to an image, and wherein said image is displayed in the absence of an electric field.

2. The device as recited in claim 1 wherein a plurality of continuous electrode layers are disposed within said display area and coupled to said polarizing filter layers and said liquid crystal layer.

3. The device as recited in claim 2 wherein said plurality of continuous electrode layers is coupled to a power source and wherein said power source provides said electric field.

4. The device as recited in claim 3 wherein said image is not displayed in the presence of said electric field.

5. The device as recited in claim 4 wherein said LCD is deployed in an electronic device chosen from the group consisting essentially of mobile telephones, global positioning systems, clocks, watches, personal digital assistants, handheld computers, calculators, pagers, video game systems and two-way radios.

6. The device as recited in claim 4 wherein displaying said image signifies an absence of power to said LCD.

7. The device as recited in claim 4 wherein said contour is a small symbol located toward the upper right corner of said total display area of said LCD.

8. The device as recited in claim 4 wherein said image is selected from the group consisting essentially of a battery shape, a lightning bolt shape, a spark shape, the letter P, the letter B, another symbol commonly associated with power availability, and each of the aforementioned with a line or diagonal line through it.

9. In an LCD, a device for indicating an absence of power to said LCD comprising:
   a continuous polarizing filter layer disposed within a display area that comprises a portion of the total display area of said LCD;
   a layer of liquid crystals disposed between alignment gratings and optically coupled to said continuous polarizing filter layer;
   a discontinuous polarizing filter layer optically coupled to said layer of liquid crystals, said discontinuous polarizing filter layer having a plane of polarization aligned with the plane of polarization of said continuous polarizing filter, and wherein said discontinuous polarizing filter layer comprises a contour within said display area conforming to an image, and wherein said image is displayed in the absence of an electric field; and
   a plurality of continuous electrode layers disposed within said display area and coupled to said polarizing filter layers and said liquid crystal layer.

10. The device as recited in claim 9 wherein said plurality of continuous electrode layers is electrically coupled to a power source.

11. The device as recited in claim 10 wherein said image is not displayed in the presence of said electric field.

12. The device as recited in claim 10 wherein said contour is a small symbol located toward the upper right corner of said total display area of said LCD.

13. The device as recited in claim 10 wherein displaying said image signifies an absence of power to said LCD.

14. The device as recited in claim 10 wherein said image is selected from the group consisting essentially of a battery shape, a lightning bolt shape, a spark shape, the letter P, the letter B, another symbol commonly associated with power availability, and each of the aforementioned with a line or diagonal line through it.

15. In an LCD, a device for indicating an absence of power to said LCD comprising:
   a continuous polarizing filter layer disposed within a display area that comprises a portion of the total display area of said LCD;
   a layer of liquid crystals disposed between alignment gratings and optically coupled to said continuous polarizing filter layer;
   a discontinuous polarizing filter layer optically coupled to said layer of liquid crystals, said discontinuous polarizing filter layer having a plane of polarization aligned with the plane of polarization of said continuous polarizing filter, and wherein said discontinuous polarizing filter layer comprises a contour within said display area conforming to an image, and wherein said image is displayed in the absence of an electric field to signify the absence of power to said LCD; and a plurality of continuous electrode layers disposed within said display area and coupled to said polarizing filter layers and said liquid crystal layer, and wherein said plurality of continuous electrode layers is electrically coupled to a power source.

16. The device as recited in claim 15 wherein said image is not displayed in the presence of said electric field.

17. The device as recited in claim 15 wherein said contour is a small symbol located toward the upper right corner of said total display area of said LCD.

18. The device as recited in claim 15 wherein said image is selected from the group consisting essentially of a battery shape, a lightning bolt shape, a spark shape, the letter P, the letter B, another symbol commonly associated with power availability, and each of the aforementioned with a line or diagonal line through it.

* * * * *